United States Patent
Cizdziel et al.

(10) Patent No.: US 11,716,632 B2
(45) Date of Patent: Aug. 1, 2023

(54) COORDINATED ACCESS POINT CHANNELIZATION FOR TRANSMISSION OPPORTUNITY SHARING

(71) Applicant: Cisco Technology, Inc., San Jose, CA (US)

(72) Inventors: Benjamin Jacob Cizdziel, San Jose, CA (US); Pooya Monajemi, Irvine, CA (US); Santosh Babaji Kulkarni, San Jose, CA (US); Vishal Satyendra Desai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 142 days.

(21) Appl. No.: 17/336,834

(22) Filed: Jun. 2, 2021

(65) Prior Publication Data

US 2022/0394487 A1    Dec. 8, 2022

(51) Int. Cl.
*H04W 4/00*       (2018.01)
*H04W 16/02*      (2009.01)
*H04W 72/04*      (2023.01)

(52) U.S. Cl.
CPC ........... *H04W 16/02* (2013.01); *H04W 72/04* (2013.01)

(58) Field of Classification Search
CPC ............................ H04W 16/02; H04W 72/04
See application file for complete search history.

(56) References Cited

U.S. PATENT DOCUMENTS

| | | | |
|---|---|---|---|
| 2013/0028158 A1* | 1/2013 | Lee | H04W 52/0206 370/311 |
| 2014/0050156 A1 | 2/2014 | Chan et al. | |
| 2015/0359008 A1* | 12/2015 | Wang | H04W 74/0875 370/330 |
| 2018/0049242 A1 | 2/2018 | Viger et al. | |
| 2018/0184402 A1* | 6/2018 | Cariou | H04W 76/15 |
| 2020/0029361 A1 | 1/2020 | Desai et al. | |
| 2020/0077273 A1* | 3/2020 | Cherian | H04W 74/06 |
| 2020/0245352 A1* | 7/2020 | Seok | H04W 72/0433 |
| 2020/0367283 A1 | 11/2020 | Cariou et al. | |

OTHER PUBLICATIONS

Jianjun Lei et al., Channel Assignment Mechanism for Multiple APs Cochannel Deployment in High Density WLANs, Wiley-Hindawi, vol. 2018, Article ID 6931765, Feb. 7, 2018, 12 Pages.

(Continued)

*Primary Examiner* — Shantell L Heiber
(74) *Attorney, Agent, or Firm* — Merchant & Gould P.C.

(57) ABSTRACT

Coordinated Frequency Division Multiplexing (FDM) Transmission Opportunity (TXOP) sharing may be provided by determining that at least two Access Points (APs) of a wireless network support coordinated FDM TXOP sharing. In response to the determination that the at least two APs support coordinated FDM TXOP sharing, at least one of: a first bias is applied to a channel assignment algorithm to promote an assignment of overlapping channels of the at least two APs, and a second bias is applied to the channel assignment algorithm to promote an assignment of adjacent channels of the at least two APs. Next, channels are assigned to the at least two APs based on an output of the channel assignment algorithm.

17 Claims, 7 Drawing Sheets

(56) References Cited

OTHER PUBLICATIONS

Lochan Verma et al., Coordinated AP Time/Frequency Sharing in a Transmit Opportunity in 11be, IEEE Nov. 2019 802.11-19/1582r2, Nov. 2019, 15 pages.
Laurent Cariou et al., C-TDMA definition, 20/0574r0, TGbe Teleconference submission, Apr. 2020, 5 pages.
Charlie Pettersson et al., Hidden Node Protection in Coordinated AP Transmissions, IEEE 802.11-20/0933r0, May 2020, 8 pages.

* cited by examiner

COORDINATED ACCESS POINT CHANNELIZATION FOR TRANSMISSION OPPORTUNITY SHARING

TECHNICAL FIELD

The present disclosure relates generally to Access Point (AP) coordination for Transmission Opportunity (TXOP) sharing in a wireless network.

BACKGROUND

In computer networking, a wireless Access Point (AP) is a networking hardware device that allows a Wireless Fidelity (Wi-Fi) compatible client to connect to a wired network and to other clients. The AP usually connects to a router (directly or indirectly via a wired network) as a standalone device, but may also be integrated with router hardware. Several APs may also work in coordination with one another, either through direct wired or wireless connections, or through a central system, commonly called a Wireless Local Area Network (WLAN) controller. An AP operates as part of a wireless network to provide Radio Frequency (RF) links (e.g., channels) for radio devices, such as clients associated with the AP. APs may support the connection of multiple wireless devices according to each AP's operating class, amount of available bandwidth, and transmit power.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
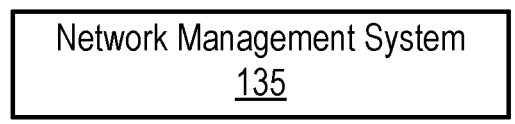
FIG. 1 is a block diagram of wireless network.
Figure 1:
Figure 1:
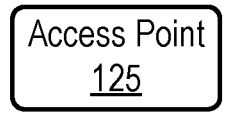
Figure 1:
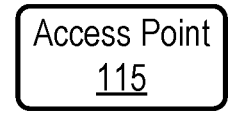
Figure 1:
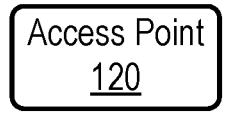
Figure 1:
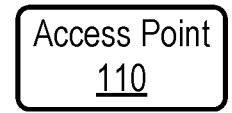
Figure 1:
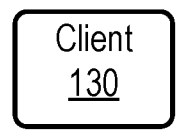

Coordinated Frequency Division Multiplexing (FDM) Transmission Opportunity (TXOP) sharing may be provided by determining that at least two Access Points (APs) of a wireless network support coordinated FDM TXOP sharing. In response to the determination that at least two APs support coordinated FDM TXOP sharing, at least one of: a first bias is applied to a channel assignment algorithm to promote an assignment of overlapping channels of the at least two APs, and a second bias is applied to the channel assignment algorithm to promote an assignment of adjacent channels of the at least two APs. Next, channels are assigned to the at least two APs based on an output of the channel assignment algorithm.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Institute of Electrical and Electronics Engineers (IEEE) 802.11be, also referred to as Wireless Fidelity (Wi-Fi) 7, introduces a set of features classified under the main category of "Access Point (AP) Coordination" that enable a number of APs in a neighborhood to coordinate their transmissions. A subset of these features includes schemes for nearby APs in the neighborhood to share Transmission Opportunities (TXOPs) among each other. For example, once an AP wins contention for a medium, it may choose to announce that parts of the TXOP are available for neighboring APs to use for their clients. The sharing of TXOPs may be performed in a time domain or in a frequency domain. Frequency resource sharing, sometimes referred to as Coordinated AP (CAP) Orthogonal Frequency Domain Multiple Access (OFDMA), is a TXOP sharing method that, after winning contention for a medium, enables an AP to partition its frequency resource and share smaller frequency allocations with neighboring APs for the duration of the TXOP. For example, after winning contention on a medium, an AP capable of Frequency Domain Multiplexing (FDM) TXOP sharing may reserve a portion of channel bandwidth for its own transmissions (e.g., 20 Megahertz (MHz) of an 80 MHz channel) and provide the remaining bandwidth to one or more neighboring APs engaged in the FDM TXOP sharing (e.g., provide 40 MHz to a first neighboring AP and the remaining 20 MHz to a second neighboring AP).

Radio Resource Management (RRM) consists of several algorithms that analyze aspects of a wireless network in attempts to determine an optimum transmit power level and channel for each AP of a wireless network. As Radio Frequency (RF) conditions change, RRM may be able to detect changes and make any appropriate adjustments to power levels or channel assignments for example. In some cases, RRM may use a channel assignment algorithm to dynamically manage channel assignments in attempt to increase system performance when CAP TXOP sharing. However, if radio resources of FDM capable APs are not allocated appropriately, TXOP sharing opportunities may not be fully realized, leading to missed opportunities for increased network performance. For example, a conventional channel assignment algorithm may be tailored to limit or block overlapping channels or adjacent channels from being assigned to neighboring APs due to potential co-channel or adjacent channel interference, which may incidentally result in lost TXOP sharing opportunities due to the reduced number of available channels for assigning and TXOP sharing.

Currently, an AP that wins contention may coordinate TXOP sharing by transmitting a TXOP sharing indication to neighbor APs capable of participating in TXOP sharing. The TXOP coordinating AP may receive TXOP sharing requests from neighboring APs wanting to participate in TXOP sharing. The TXOP coordinating AP may inform any participating neighboring APs of allocated subchannels, an allocated TXOP duration, and a Transmit (TX) start time, which may be forwarded to clients that are associated with the participating APs. Participating APs may then transmit on respective allocated subchannels for the allocated TXOP duration beginning at the TX start time. If the channel assignment algorithm is tuned to limit or block consideration of overlapping channels or adjacent channels of the participating APs, TXOP sharing opportunities may be unrealized and thus potential TXOP sharing gains to the network reduced.

Embodiments described herein overcome these above-described deficiencies in part by biasing a channel assignment algorithm in part to induce FDM TXOP sharing gains. For example, a channel assignment algorithm may be biased so that overlapping channels of neighboring APs are available for FDM TXOP sharing. As a further example, the channel assignment algorithm may be biased so that adjacent channels are assigned to neighboring APs to realize FDM TXOP sharing gains as well as improve channel access opportunities for APs so that traffic may be more scheduled and predictable within a wireless network.

FIG. 1 shows a block diagram of wireless network 100. As shown in FIG. 1, network 100 may be a Wireless Local Area Network (WLAN) comprising a controller 105 and a plurality of APs, such as first AP 110, second AP 115, third AP 120, and fourth AP 125. Controller 105 may be a WLAN controller that manages and configures the APs of network 100. The APs may be networking hardware devices that enable other devices, such as client 130, to connect to network 100. For example, client 130 may be associated with first AP 110 to connect to network 100, where first AP 110, client 130, and any other clients associated with first AP 110 may form a first Basic Service Set (BSS).

For illustrative clarity, a single client (e.g., client 130) is shown. However, network 100 may comprise a plurality of clients. These clients, including client 130, may comprise, but are not limited to, a phone, a smartphone, a digital camera, a tablet device, a laptop computer, a personal computer, a mobile device, a sensor, an Internet-of-Things (IoTs) device, a cellular base station, a telephone, a remote control device, a set-top box, a digital video recorder, a cable modem, a network computer, a mainframe, a router, or any other similar microcomputer-based device capable of accessing and using a Wi-Fi network or a cellular network.

In some examples, there may be a common management entity, such as a network management system 135, managing or coordinating at least a subset of network 100. For example, network management system 135 may facilitate TXOP sharing between one or more sets of coordinated APs, such as first AP 110 and second AP 115. One non-limiting example of network management system 135 is the Cisco® Digital Network Architecture Center (DNA-C).

Network management system 135, as part of its RRM protocol, may also manage configuration and application of a channel assignment algorithm to assign channels to first AP 110, second AP 115, third AP 120, and fourth AP 125. For example, network management system 135 may apply one or more biases to a channel assignment algorithm to promote or induce FDM TXOP sharing gains relative to multiple (e.g., at least two) APs that support coordinated FDM TXOP sharing. In other aspects, another device or component, such as controller 105, a master AP, etc. may implement RRM to configure a channel assignment algorithm to support coordinated FDM TXOP sharing.

Network management system 135 may also manage channelization schemes employed by one or more of first AP 110, second AP 115, third AP 120, and fourth AP 125 depending in part on the respective capabilities of each AP. For example, network management system 135 may send a message to one or more of first AP 110, second AP 115, third AP 120, and fourth AP 125 to adjust a receive (RX) bandwidth to be greater than a TX bandwidth if the respective AP is capable of supporting such a radio configuration. As another example, network management system 135 may assign a delegator role to at least one of first AP 110, second AP 115, third AP 120, and fourth AP 125 and assign a wider TX/RX bandwidth of the AP with the delegator role as compared to the TX/RX bandwidths of neighboring APs. By employing one or more of these channelization schemes, system 100 may see an increase in FDM TXOP sharing gains. According to the example of FIG. 1, if multiple (e.g., at least two) of first AP 110, second AP 115, third AP 120, and fourth AP 125 support FDM TXOP sharing, network management system 135 or another component may configure and execute the channel assignment algorithm to enable FDM TXOP sharing to service client 130.

Embodiments as described herein provide channelization schemes and/or channel assignment algorithm biases that may induce or promote FDM TXOP sharing gains. The elements described above of network 100 (e.g., controller 105, first AP 110, second AP 115, third AP 120, fourth AP 125, and network management system 135) may be practiced in hardware and/or in software (including firmware, resident software, micro-code, etc.) or in any other circuits or systems. The elements of network 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of network 100 may also be practiced using other technologies capable of performing logical operations such as, for example, AND, OR, and NOT, including but not limited to, mechanical, optical, fluidic, and quantum technologies. As described in detail below with respect to FIG. 5, the elements of network 100 may be practiced in a computing device 500.

Figure 2A:
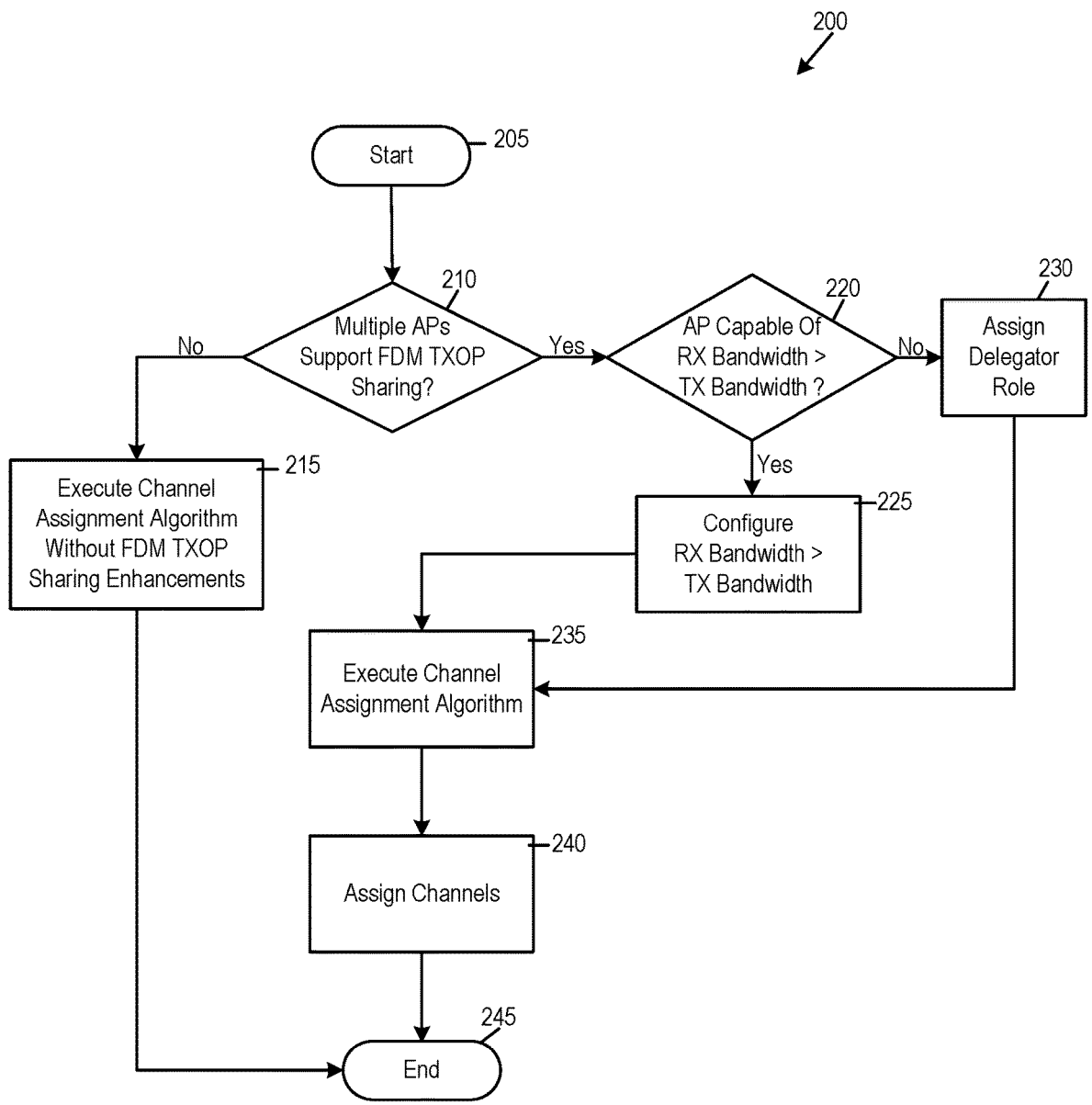
FIG. 2A is a flow chart of a method for providing coordinated Frequency Division Multiplexing (FDM) Transmission Opportunity (TXOP) sharing.

FIG. 2A is a flow chart setting forth the general stages involved in a method 200 consistent with embodiments of the disclosure for providing coordinated FDM TXOP sharing. Method 200 may be implemented using computing device 500 (e.g., network management system 135 may manage one or more channelization schemes and/or channel assignment algorithm biases) as described in more detail below with respect to FIG. 5.

Method 200 may begin at starting block 205 and proceed to decision 210, where a determination is made as to whether multiple (e.g., at least two) of first AP 110, second AP 115, third AP 120, and fourth AP 125 support FDM TXOP sharing. For example, each of first AP 110, second AP 115, third AP 120, or fourth AP 125 may transmit a message with their radio capabilities to controller 105 or network management system 135, which may be used for channelization configurations of first AP 110, second AP 115, third AP 120, or fourth AP 125.

If only one or no APs support FDM TXOP sharing at decision 210, method 200 proceeds to stage 215 where the channel assignment algorithm is executed without FDM TXOP sharing enhancements. For example, at stage 215, method 200 executes the channel assignment algorithm without channelization and/or biasing enhancements for FDM TXOP sharing when assigning channels to first AP 110, second AP 115, third AP 120, and/or fourth AP 125 before proceeding to stage 245.

If multiple (e.g., at least two) APs are determined to support FDM TXOP sharing at decision 210, method 200 proceeds to decision 220 to determine if at least one of the multiple APs that support FDM TXOP sharing is able to configure a RX bandwidth to encompass a larger range of frequencies than a TX bandwidth. For example, each AP may transmit its capabilities to controller 125 or network management system 135 that identifies the capability to configure its RX bandwidth to encompass a larger range of frequencies than its TX bandwidth. If at least one of the multiple APs that support FDM TXOP sharing is able to support a wider RX bandwidth (e.g. encompass a larger range of frequencies) than its TX bandwidth at decision 220, method 200 proceeds to stage 225 and configures the RX bandwidth of the at least one AP that supports FDM TXOP sharing to encompass a larger range of frequencies than the TX bandwidth before proceeding to stage 235. For example, assuming first AP 110 is able to support the wider RX bandwidth to TX bandwidth radio configuration, network management system 135 may transmit a message to first AP 110 with instructions to configure its RX bandwidth to encompass a frequency band of 160 MHz (e.g., channels 100-128 of the 5 Gigahertz (GHz) band) and its TX bandwidth to encompass a frequency band of 40 MHz (e.g., channels 116 and 120 of the 5 GHz band).

By enabling the RX bandwidth to encompass a larger range of frequencies than the TX bandwidth, first AP 110 may contend for the medium across a larger range of frequencies according to the RX bandwidth and thereby promote an increase in FDM TXOP sharing gains between first AP 110 and FDM TXOP participating APs. Coordinated FDM TXOP sharing gains may be further increased when a neighboring AP that supports FDM TXOP sharing (e.g., third AP 120) is also able to configure its RX bandwidth to encompass a larger range of frequencies as compared to its TX bandwidth, thereby potentially providing a contention window that encompasses the combined RX bandwidths. In some aspects, if multiple APs support a wider RX bandwidth than the TX bandwidth at decision 220, method 200 may assign the delegator role to a particular AP based on it having at least one of a largest RX bandwidth capability, a client density, and/or a predicted FDM TXOP sharing gain.

If there are no APs able to support a wider RX bandwidth than the TX bandwidth at decision 220, method 200 proceeds to stage 230 and assigns a delegator role to one of first AP 110, second AP 115, third AP 120, or fourth AP 125 before proceeding to stage 235. For example, network management system 135 or controller 105 may assign the delegator role to an AP having the most clients (i.e. greatest client density) and/or based on a predicted FDM TXOP sharing gain that may be achieved during a TXOP duration for the AP that accounts for any sharing APs. Once assigned the delegator role, that AP may be assigned a larger TX/RX bandwidth than its neighboring APs that support FDM TXOP sharing in order to contend for a wide range of frequencies that may be used when FDM TXOP sharing.

For example, network management system 135 or controller 105 may assign the delegator role to first AP 110 which may result in a RX bandwidth being assigned to first AP 110 that includes a larger range of frequencies (e.g., 160 MHz, 320 MHz, etc.) as compared to each TX/RX bandwidth of second AP 115, third AP 120, or fourth AP 125 (e.g., each having a 20 MHz TX/RX bandwidth). Since AP 110 has a larger RX bandwidth, AP 100 is able to share FDM TXOPs with one or more of second AP 115, third AP 120, or fourth AP 125 as long as they support FDM TXOP sharing and thereby may realize an increase in FDM TXOP sharing gains.

At stage 235, method 200 executes a channel assignment algorithm as part of assigning channels to first AP 110, second AP 115, third AP 120, and fourth AP 125 to promote FDM TXOP sharing. As one example, the enhanced channel assignment algorithm, described in more detail with respect to FIG. 2B below, may introduce channelization and/or biasing to promote assignment of overlapping and adjacent channels to promote FDM TXOP sharing gains.

At stage 240, method 200 uses the channel assignment algorithm to assign channels to each of first AP 110, second AP 115, third AP 120, and fourth AP 125 before method 200 ends at stage 245. It will be appreciated that method 200 may be utilized to assign channels to APs at certain times, time intervals, upon deployment or removal of one or more APs, for high density client environments, etc. According to an aspect, method 200 at stage 240 utilizes the channel assignment algorithm to determine a score for each channel to be assigned to each of first AP 110, second AP 115, third AP 120, and fourth AP 125, where the score is a function of at least one of a predicted or observed FDM TXOP sharing gain, a density or number of clients per AP (e.g., particularly a density or number of clients that support TXOP sharing such as IEEE 802.11be clients), and/or a location of clients relative to each AP.

For example, more bias may be applied to the channel assignment algorithm so that APs having more associated clients are prioritized in the channel assignment determination in part to account for predicted or observed FDM TXOP sharing gains for clients that support IEEE 802.11be. For example, an AP that supports FDM TXOP sharing having the most associated clients may be prioritized to receive the first channel assignment that may include a widest possible range of frequencies to induce increased FDM TXOP sharing opportunities and gains and FDM TXOP.

Location of and/or density clients may also be used in the determination of channel assignment priority. For example, in some cases a client will remain associated with an AP that is not ideal (e.g., a sticky client moving toward a network boundary or edge) and this type of client may reduce the priority or score when assigning a channel to a particular AP. The score determination may be a function of a number of parameters such as, but not limited to: transmit power levels, channel bandwidths, non-WiFi device avoidance, overlapping or co-channel interference bias, adjacent channel bias, load avoidance, noise avoidance, foreign AP avoidance, etc.

In some aspects, the determination of an AP to be assigned a delegator role may be executed independently from the channel assignment determination. Likewise, in some aspects, execution of the channel assignment algorithm and/or application of one or more biases may be executed independently from the delegator role determination and assignment. For example, a first processing loop executed at a first time interval can be used for assigning the delegator role and a second processing loop executed at a second time interval can be used for assigning channels.

Figure 2B:
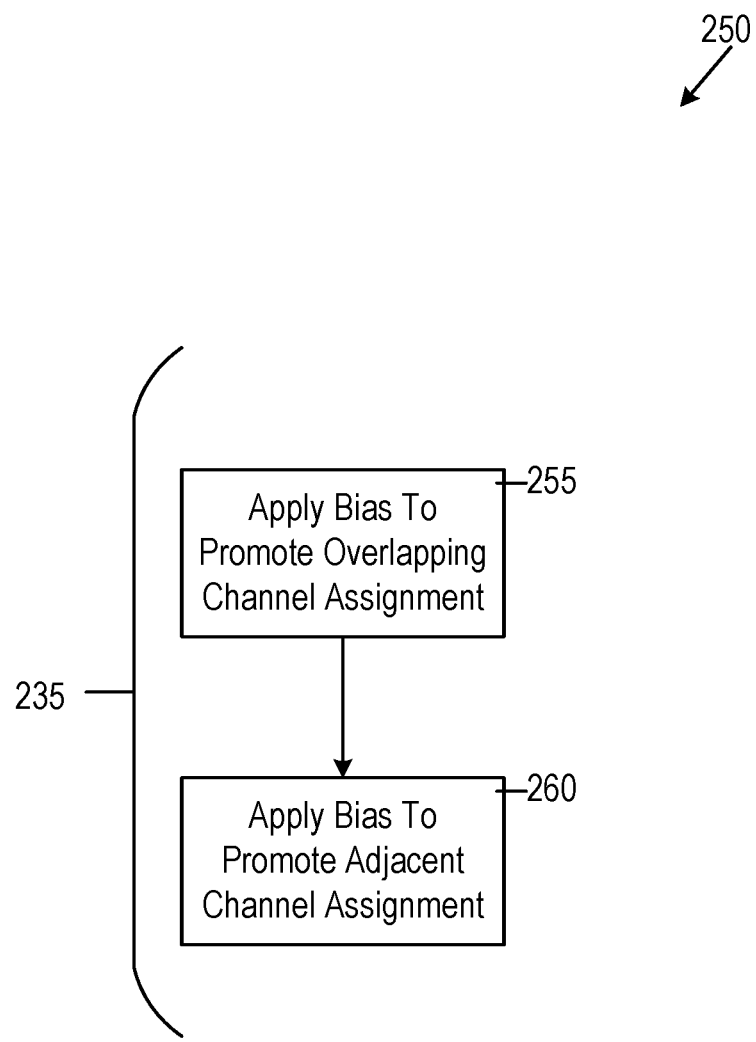
FIG. 2B is a flow chart of an exemplary method of using a channel assignment algorithm to apply biases when providing coordinated FDM TXOP sharing.

FIG. 2B is a flow chart of an exemplary method 250 of using a channel assignment algorithm to apply biases when providing coordinated FDM TXOP sharing. As shown in FIG. 2B, for this example, stage 235 of FIG. 2A includes two stages (stage 255 and 260). At stage 255, as part of executing the channel assignment algorithm, method 250 applies a bias that promotes an assignment of overlapping channels of first AP 110, second AP 115, third AP 120, and/or fourth AP 125. For example, a bias may be applied that reduces a penalty applied for overlapping channels. As an example, if first AP 110 is using a 40 MHz channel that covers 20 MHz channels 36 and 40 and second AP 115 is using an 80 MHz channel that covers channels 36-44, since channels 36 and 40 are used by both APs, if one AP wins contention the added bias may result in TXOP sharing using channel 36 and/or 40.

Conventionally, channel assignment algorithms are tailored to limit or prevent use of overlapping channels to limit or reduce co-channel interference. In contrast, method 250 at stage 255 biases the channel assignment algorithm so that overlapping channels are available for use in FDM TXOP sharing by first AP 110, second AP 115, third AP 120, and fourth AP 125. The availability of overlapping channels provides additional available frequencies for FDM TXOP sharing opportunities which may further increase FDM TXOP sharing gains.

At stage 260, method 250 applies a bias to the channel assignment algorithm to promote assignment of adjacent channels. For example, if first AP 110 and second AP 115 operate on adjacent channels, they may be able to contend to win medium over a larger bandwidth that includes each other's operating bandwidth and then share a frequency portion of the larger TXOP sharing opportunity with FDM capable neighbors.

Conventionally, channel assignment algorithms are tailored to limit or prevent use of adjacent channels to limit or reduce adjacent channel interference. In contrast, method 250 at stage 260 biases the channel assignment algorithm so that adjacent channels are available for assigning to one or more of first AP 110, second AP 115, third AP 120, and/or fourth AP 125 before proceeding to stage 240 (see FIG. 2A). As described herein, the availability of adjacent channels for use in FDM TXOP sharing may further increase FDM TXOP sharing opportunities, and thus FDM TXOP sharing gains.

Figure 3:
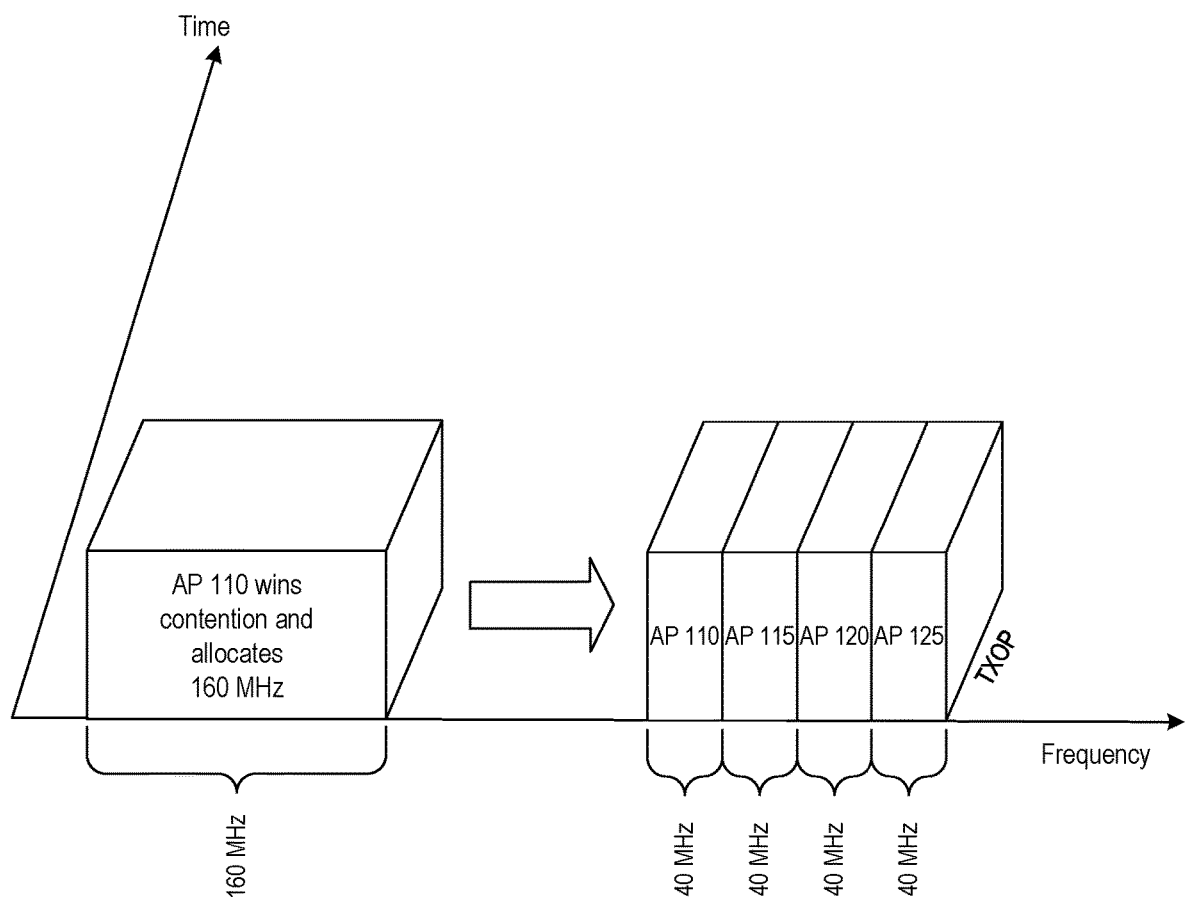
FIG. 3 is a diagram that depicts an example of coordinated FDM TXOP sharing.

FIG. 3 is a diagram that depicts an example of coordinated FDM TXOP sharing as a function of time and frequency for first AP 110, second AP 115, third AP 120, and fourth AP 125. For this example, first AP 110 has been assigned a delegator role and won contention for the medium for the TXOP duration with an assigned TX/RX channel bandwidth of 160 MHz. For the TXOP duration, second AP 115, third AP 120, and fourth AP 125 have each been allocated a 40 MHz portion of the 160 MHz bandwidth available to AP 110 for FDM TXOP sharing. AP 110 reserves the remaining 40 MHz for its own transmissions during the TXOP duration.

Figure 4A:
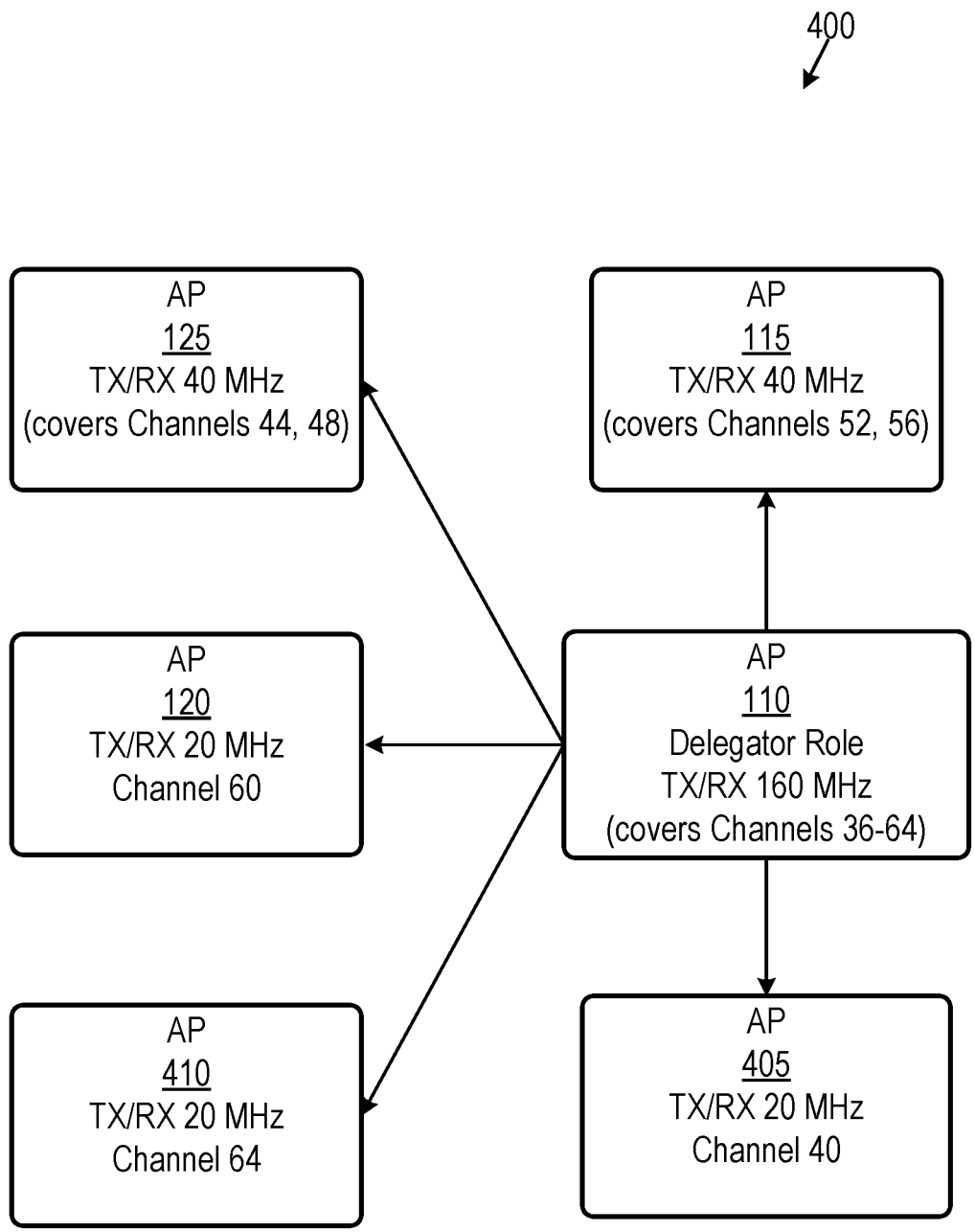
FIGS. 4A and 4B are diagrams that depict examples of coordinated FDM TXOP sharing.
Figure 4B:
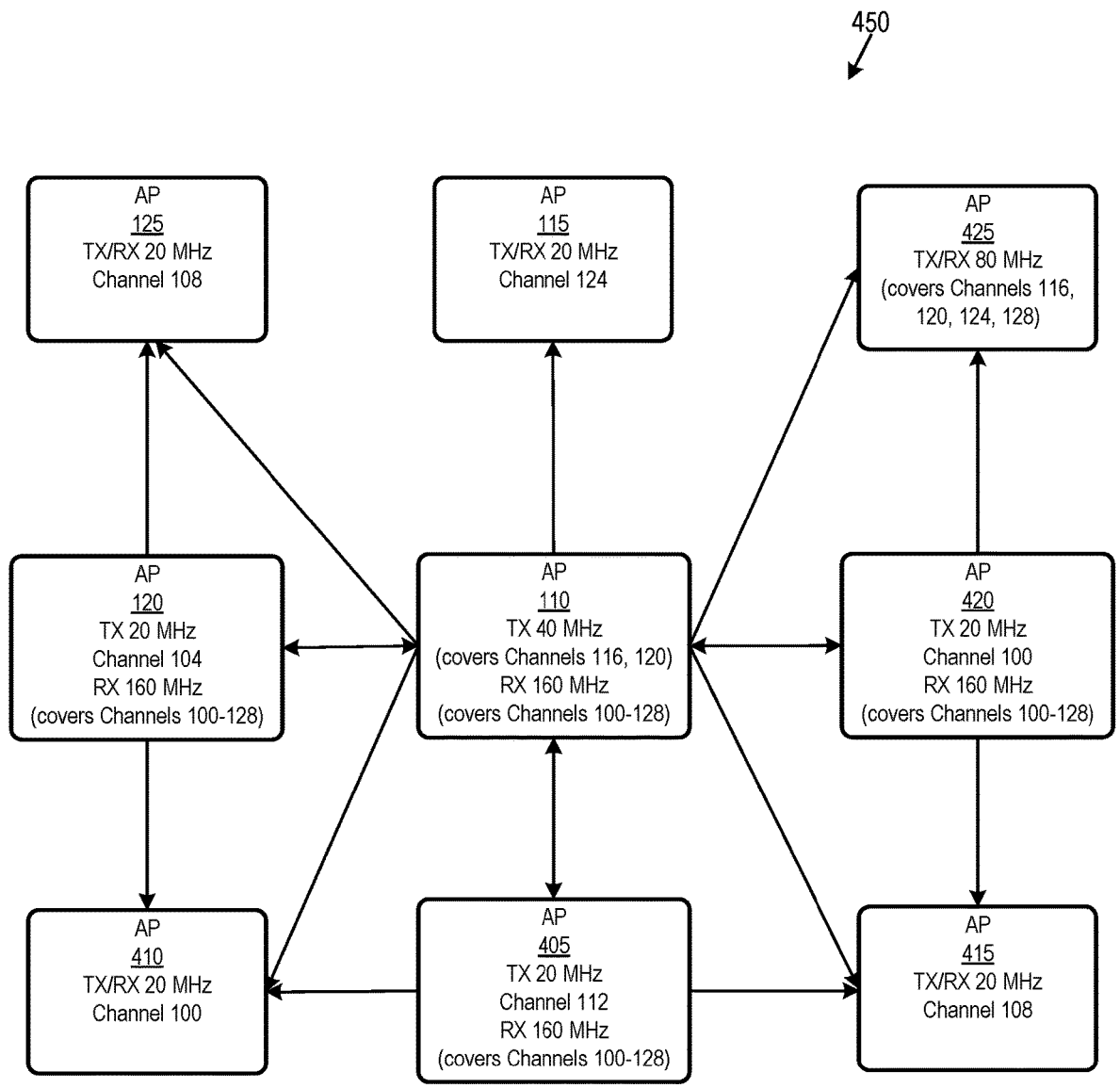

FIGS. 4A and 4B are diagrams that depict examples of coordinated FDM TXOP sharing where each of the depicted APs support FDM TXOP sharing according to aspects described herein. FIG. 4A depicts an example network 400 that is similar to network 100 described in FIG. 1 (e.g., includes first AP 110, second AP 115, third AP 120, fourth AP 125) and further includes fifth AP 405, and sixth AP 410. For this example, none of first AP 110, second AP 115, third AP 120, fourth AP 125, fifth AP 405, or sixth AP 410 are able to configure an RX bandwidth to encompass a larger range of frequencies than a TX bandwidth. Therefore, in accordance with stage 230 of method 200 described in FIG. 2, one of the APs is assigned a delegator role. For the example of FIG. 4A, a delegator role has been assigned to first AP 110 that supports FDM TXOP sharing. For example, network management system 135 may promote FDM TXOP sharing by determining that first AP 110 should be assigned the delegator role with a largest TX/RX bandwidth due in part to it having a largest number of associated clients as compared to the other APs (second AP 115, third AP 120, fourth AP 125, fifth AP 405, or sixth AP 410).

As shown in FIG. 4A, output from the channel assignment algorithm has resulted in assigning a 160 MHz wide TX/RX bandwidth (covers eight 20 MHz channels (channels 36-64)) to first AP 110 with the delegator role. Accordingly, first AP 110 is able to contend for the medium over a wider range of frequencies as compared to the narrower range of frequencies dictated by the channel assignments of second AP 115, third AP 120, fourth AP 125, fifth AP 405, and sixth AP 410. During the TXOP duration, first AP 110 may delegate portions of its wider bandwidth with one or more of second AP 115, third AP 120, fourth AP 125, fifth AP 405, and sixth AP 410 when FDM TXOP sharing which may thereby increase FDM TXOP sharing gains.

According to this example, output from the channel assignment algorithm has resulted in assigning: a 40 MHz TX/RX channel to second AP 115 that includes two 20 MHz channels (channels 52 and 56), a 20 MHz TX/RX channel to third AP 120 (channel 60), a 40 MHz TX/RX channel to fourth AP 125 that includes two 20 MHz channels (channels 44 and 48), a 20 MHz TX/RX channel (channel 40) to fifth AP 405, and a 20 MHz TX/RX channel (channel 64) to sixth AP 410.

As described herein, biasing the channel assignment algorithm has resulted in adjacent 40 MHz channels being assigned to second AP 115 and fourth AP 125. Likewise, biasing the channel assignment algorithm has resulted in adjacent 20 MHz channels being assigned to third AP 120 and sixth AP 410. The 160 MHz channel bandwidth assigned to first AP 100 also includes channels that overlap with channels assigned to second AP 115, third AP 120, fourth AP 125, fifth AP 405, and sixth AP 410 due to the bias applied to the channel assignment algorithm that reduced the penalty for overlapping channels. As illustrated by the outgoing arrows in FIG. 4A, once first AP 110 has won contention with the delegator role, first AP 110 is able to share TXOPs with each of second AP 115, third AP 120, fourth AP 125, fifth AP 405, and sixth AP 410 for the TXOP duration.

FIG. 4B depicts an example network 450 that is similar to network 400 described in FIG. 4A (e.g., includes first AP 110, second AP 115, third AP 120, fourth AP 125, fifth AP 405, and sixth AP 410) and further includes seventh AP 415, eighth AP 420, and ninth AP 425. In this example, each of first AP 110, third AP 120, fifth AP 405, and eighth AP 420 support a radio configuration or setting where the RX bandwidth encompasses a larger range of frequencies than the TX bandwidth. APs with such capability may include software and/or hardware configured to adjust the RX bandwidth to cover a larger range of frequencies as compared to the TX bandwidth. As such, APs having this capability may be able to contend for a larger range of spectrum to share TXOPs with other APs that support FDM TXOP sharing, which may result in increased FDM TXOP sharing gains and FDM TXOP sharing opportunities. For example, with the knowledge of such capability, network management system 135 may send a message to each of AP 110, third AP 120, fifth AP 405, and eighth AP 420 to configure the RX bandwidth to cover a larger range of frequencies than the TX bandwidth which results in a wider range of frequencies that may be used for medium contention and FDM TXOP sharing, which may result in increased FDM TXOP sharing gains.

For this example, first AP 110 has adjusted its RX bandwidth to 160 MHz (covering eight 20 MHz channels 100-128), third AP 120 has adjusted its RX bandwidth to 160 MHz (covering eight 20 MHz channels 100-128), fifth AP 405 has adjusted its RX bandwidth to 160 MHz (covering eight 20 MHz channels 100-128), and eighth AP 420 has adjusted its RX bandwidth to 160 MHz (covering eight 20 MHz channels 100-128). Each of first AP 110, third AP 120, fifth AP 405, and eighth AP 420 are able to contend for a wide spectrum and share TXOPs over the wide spectrum with neighboring APs.

In the example of FIG. 4B, first AP 110, third AP 120, fifth AP 405, and eighth AP 420 may share TXOPs across the frequencies encompassed by the 160 MHz receiving spectrum while serving clients on a smaller subset of frequencies according to the TX bandwidth. By adjusting the RX bandwidth to cover a larger range of frequencies as compared to the TX bandwidth, each of first AP 110, third AP 120, fifth AP 405, and eighth AP 420 are able to contend for the medium across 160 MHz of frequencies which may result in an increase in FDM TXOP sharing opportunities and gains. For the example FIG. 4B, the RX bandwidths cover the same range of frequencies but in alternative examples the RX bandwidths may be configured with different sizes covering different frequency ranges.

As shown in the example of FIG. 4B, output from the channel assignment algorithm has resulted in assigning: a 40 MHz TX channel to first AP 110 that covers two 20 MHz channels (channels 116 and 120), a 20 MHz TX/RX channel (channel 124) to second AP 115, a 20 MHz TX channel (channel 104) to third AP 120, a 20 MHz TX/RX channel (channel 108) to fourth AP 125, a 20 MHz TX channel (channel 112) to fifth AP 405, a 20 MHz TX/RX channel (channel 100) to sixth AP 410, a 20 MHz TX/RX channel (channel 108) to seventh AP 415, a 20 MHz TX channel (channel 100) to eighth AP 420, and an 80 MHz TX/RX channel covering four 20 MHz channels (channels 116, 120, 124, and 128) to ninth AP 425.

As illustrated by the outgoing arrows in FIG. 4B, when first AP 110 has won contention, first AP 110 is able to share TXOPs with each of second AP 115, third AP 120, fourth AP 125, fifth AP 405, sixth AP 410, seventh AP 415, eighth AP 420, and ninth AP 425 for the TXOP duration. When third AP 120 has won contention, third AP 120 is able to share TXOPs with each of first AP 110, fourth AP 125, and sixth AP 410 for the TXOP duration. When fifth AP 405 has won contention, fifth AP 405 is able to share TXOPs with each of first AP 110, sixth AP 410, and seventh AP 415 for the TXOP duration. When eighth AP 420 has won contention, eighth AP 420 is able to share TXOPs with each of first AP 110, seventh AP 415, and ninth AP 425 for the TXOP duration. While not shown in FIG. 4B, in some cases a sharing AP may also be able to share with 2-hop neighboring APs.

As described above and as shown in FIG. 4B, biasing the channel assignment algorithm has resulted in a 20 MHz overlapping channel (channel 100) being assigned to sixth AP 410 and eighth AP 420. Biasing the channel assignment algorithm has also resulted in second AP 115 being assigned an overlapping channel (channel 124) with respect to the 80 MHz channel assigned to ninth AP 425 (covers four 20 MHz channels 116, 120, 124, and 128). Biasing the channel assignment algorithm has also resulted in: adjacent 20 MHz channels being assigned to fifth AP 405 (channel 112) and seventh AP 415 (channel 108); adjacent 20 MHz channels being assigned to sixth AP 410 (channel 100) and third AP 120 (channel 104); adjacent 20 MHz channels being assigned to third AP 120 (channel 104) and fourth AP 125 (channel 108); 20 MHz channel (channel 124) being assigned to second AP 115 and a 20 MHz channel being assigned to fifth AP 405 (channel 112) which are both adjacent to the 40 MHz channel that encompasses two 20 MHz channels (channels 116 and 120) assigned to first AP 110. As illustrated by the example of FIG. 4B, potential FDM TXOP sharing opportunities and gains may be amplified based on the number of APs that support a wider RX bandwidth.

Figure 5:
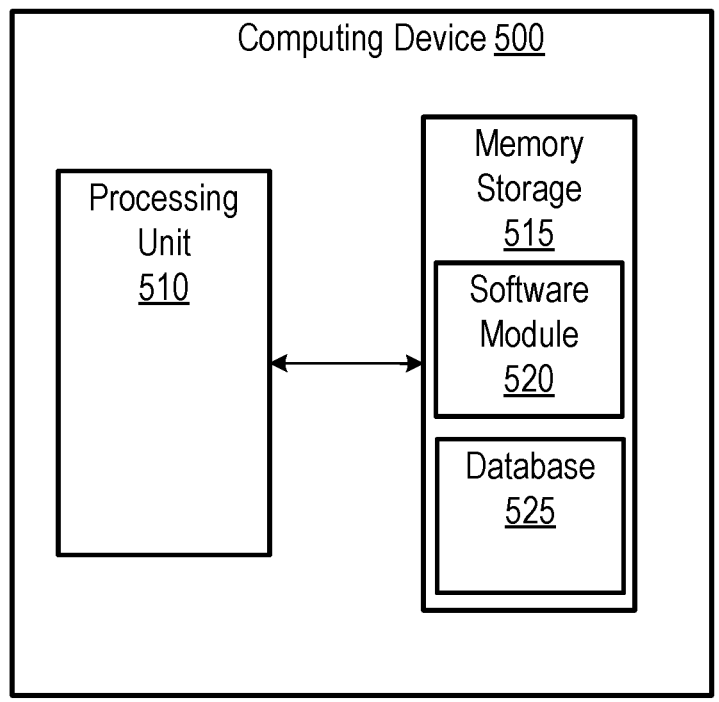
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for FDM-based TXOP sharing as described above with respect to FIG. 2, FIG. 3, and FIGS. 4A, 4B. Computing device 500, for example, may provide an operating environment for controller 105, first AP 110, second AP 115, third AP 120, fourth AP 125, fifth AP 405, sixth AP 410, seventh AP 415, eighth AP 420, ninth AP 425, network management system 135, etc. Controller 105, first AP 110, second AP 115, third AP 120, fourth AP 125, fifth AP 405, sixth AP 410, seventh AP 415, eighth AP 420, ninth AP 425, and network management system 135 may operate in other environments and are not limited to computing device 500.

Computing device 500 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where various components may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with respect to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A system comprising:
    a processing unit; and
    memory storage that includes instructions which, when executed by the processing unit, causes the processing unit to:
        determine that at least two Access Points (APs) of a wireless network support coordinated Frequency Division Multiplexing (FDM) Transmission Opportunity (TXOP) sharing;
        in response to the determination that the at least two APs support coordinated FDM TXOP sharing, apply at least one of:
            a first bias to a channel assignment algorithm to promote an assignment of overlapping channels of the at least two APs; and
            a second bias to the channel assignment algorithm to promote an assignment of adjacent channels of the at least two APs;
        assign channels to the at least two APs based on an output of the channel assignment algorithm; and
        determine that at least one AP of the at least two APs supports a radio configuration with a Receiver (RX) bandwidth greater than a Transmitter (TX) bandwidth; and
        configure the radio configuration of the at least one AP to include the RX bandwidth greater than the TX bandwidth.

2. The system of claim 1, wherein the processing unit is further caused to adjust at least one of the first bias or the second bias to account for a number of clients associated with each of the at least two APs.

3. The system of claim 2, wherein the processing unit is further caused to execute the channel assignment algorithm to determine a score for each channel to be assigned to each AP that supports coordinated FDM TXOP sharing, wherein the score is a function of predicted or observed FDM TXOP sharing gains.

4. The system of claim 3, wherein the predicted FDM TXOP sharing gains correspond with availability of an overlapping channel or an adjacent channel of one or more APs that support coordinated FDM TXOP sharing relative to a channel of an AP that supports coordinated FDM TXOP sharing being considered for a channel assignment.

5. The system of claim 1, wherein the processing unit is further caused to:
    assign a delegator role to at least one AP of the at least two APs;
    determine at least one neighboring AP that supports coordinated FDM TXOP sharing relative to the AP having the delegator role; and
    determine availability of an overlapping channel or an adjacent channel of the at least one neighboring AP based on a channel of the at least one AP having the delegator role.

6. The system of claim 5, wherein the channel of the at least one AP having the delegator role includes a channel bandwidth that is greater than a channel bandwidth used by the at least one neighboring AP.

7. The system of claim 1, wherein the processing unit is further caused to: determine at least one neighboring AP that supports coordinated FDM TXOP sharing relative to the at least one AP having the RX bandwidth greater than the TX bandwidth; and determine availability of an overlapping channel or an adjacent channel of the at least one neighboring AP based on a channel of the at least one AP having the RX bandwidth greater than the TX bandwidth.

8. The system of claim 1, wherein the processing unit is further caused to: determine that there is at least one neighboring AP that supports a radio configuration with a RX bandwidth greater than a TX bandwidth relative to the at least one AP having the RX bandwidth greater than the TX bandwidth; and determine a predicted TXOP sharing gain based on an amount of RX bandwidth or an amount of TX bandwidth available to the at least one neighboring AP and the at least one AP.

9. A method comprising:
    determining that at least two Access Points (APs) of a wireless network support coordinated Frequency Division Multiplexing (FDM) Transmission Opportunity (TXOP) sharing;
    in response to the determination that the at least two APs support coordinated FDM TXOP sharing, applying at least one of:
        a first bias to a channel assignment algorithm to promote an assignment of overlapping channels of the at least two APs; and
        a second bias to the channel assignment algorithm to promote an assignment of adjacent channels of the at least two APs;
    assigning channels to the at least two APs based on an output of the channel assignment algorithm;
    determining that at least one AP of the at least two APs supports a radio configuration with a Receiver (RX) bandwidth greater than a Transmitter (TX) bandwidth; and
    configuring the radio configuration of the at least one AP to include the RX bandwidth greater than the TX bandwidth.

10. The method of claim 9, further comprising adjusting at least one of the first bias or the second bias to account for a number of clients associated with each of the at least two APs.

11. The method of claim 9, further comprising executing the channel assignment algorithm as part of determining a score for each channel to be assigned to each AP that supports coordinated FDM TXOP sharing, wherein the score is a function of predicted or observed FDM TXOP sharing gains.

12. The method of claim 11, wherein the predicted FDM TXOP sharing gains correspond with availability of an overlapping channel or an adjacent channel of one or more APs that support coordinated FDM TXOP sharing relative to a channel of an AP that supports coordinated FDM TXOP sharing being considered for a channel assignment.

13. The method of claim 9, further comprising:
    assigning a delegator role to at least one AP of the at least two APs;
    determining at least one neighboring AP that supports coordinated FDM TXOP sharing relative to the AP having the delegator role; and
    determining availability of an overlapping channel or an adjacent channel of the at least one neighboring AP based on a channel of the at least one AP having the delegator role, wherein the channel of the at least one AP having the delegator role includes a channel bandwidth that is greater than a channel bandwidth used by the at least one neighboring AP.

14. The method of claim 9, further comprising:
    determining at least one neighboring AP that supports coordinated FDM TXOP sharing relative to the at least one AP having the RX bandwidth greater than the TX bandwidth; and determining availability of an overlapping channel or an adjacent channel of the at least one neighboring AP based on a channel of the at least one AP having the RX bandwidth greater than the TX bandwidth.

15. A non-transitory computer-readable medium that stores a set of instructions which when executed perform a method executed by the set of instructions comprising:
    determining that at least two Access Points (APs) of a wireless network support coordinated Frequency Division Multiplexing (FDM) Transmission Opportunity (TXOP) sharing;
    in response to the determination that the at least two APs support coordinated FDM TXOP sharing, applying at least one of:
        a first bias to a channel assignment algorithm to promote an assignment of overlapping channels used by the at least two APs; and
        a second bias to the channel assignment algorithm to promote an assignment of adjacent channels of the at least two APs;
    assigning channels to the at least two APs based on an output of the channel assignment algorithm;
    determining that at least one AP of the at least two APs supports a radio configuration with a Receiver (RX) bandwidth greater than a Transmitter (TX) bandwidth; and
    configuring the radio configuration of the at least one AP of the at least two APs to include the RX bandwidth greater than the TX bandwidth.

16. The non-transitory computer-readable medium of claim 15, further comprising adjusting at least one of the first bias or the second bias to account for a number of clients associated with each of the at least two APs.

17. The non-transitory computer-readable medium of claim 15, further comprising:
    assigning a delegator role to at least one AP of the at least two APs;
    determining at least one neighboring AP that supports coordinated FDM TXOP sharing relative to the AP assigned the delegator role; and
    determining availability of an overlapping channel or an adjacent channel of the at least one neighboring AP based on a channel of the at least one AP having the delegator role.

* * * * *